July 8, 1924.

J. C. KING

MILK COOLER

Original Filed Nov. 11, 1922

1,500,877

J. C. King
INVENTOR

BY Victor J. Evans
ATTORNEY

WITNESS:

Patented July 8, 1924.

1,500,877

UNITED STATES PATENT OFFICE.

JESSE C. KING, OF LINDLEY, NEW YORK.

MILK COOLER.

Application filed November 11, 1922, Serial No. 600,340. Renewed May 23, 1924.

*To all whom it may concern:*

Be it known that I, JESSE C. KING, a citizen of the United States, residing at Lindley, in the county of Steuben and State of New York, have invented new and useful Improvements in Milk Coolers, of which the following is a specification.

My present invention has reference to a milk cooler and aerator, and has for its object to produce a device of this character which shall be characteristic of simplicity in construction, cheapness in manufacture, coupled with ease and efficiency in operation.

To the attainment of the foregoing, and other objects which will present themselves as the nature of the invention is better understood, reference is to be had to the drawing which accompanies and which forms part of this application.

In the drawing:—

Figure 1:
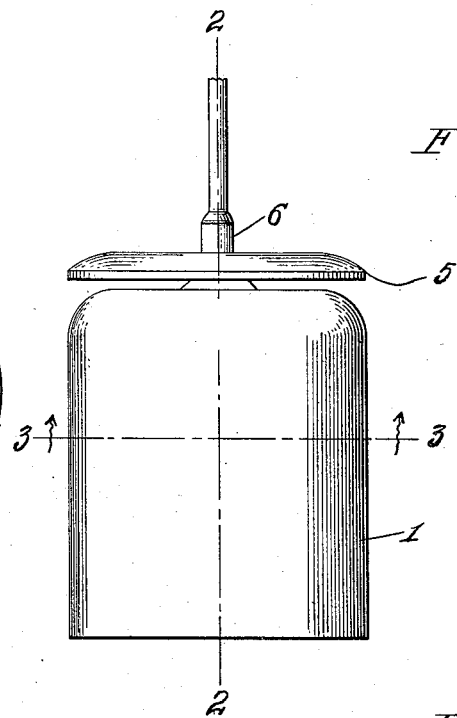
Figure 1 is an elevation of the improvement.
Figure 2:
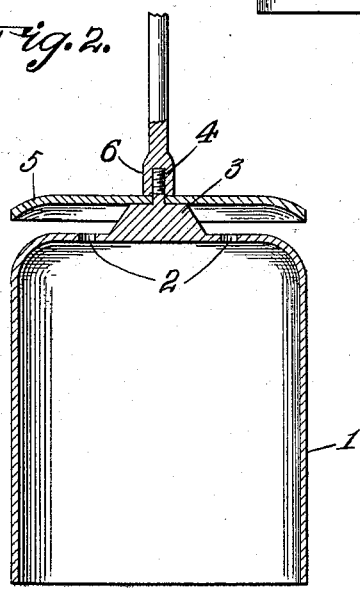
Figure 2 is a sectional view on the line 2—2 of Figure 1.
Figure 3:
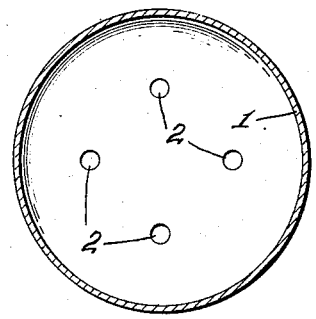
Figure 3 is a sectional view on the line 3—3 of Figure 1.

My improvement includes a tubular member 1, which may be constructed of any desired material and which has its closed top provided with any desired number of circumferentially arranged spaced apertures 2. The opposite or bottom end of the member 1 is open. The top 2 of the member 1 is centrally provided with an outstanding boss 3, and with a short centrally arranged stem 4 which projects from the boss. Designed to rest on the boss and having a central opening receiving therethrough the stem 4 there is a disk 5. Preferably the disk 5 has its peripheral edge flared downwardly in the direction of the rounded corner between the top 2 and the body of the member 1. Screwed on the stem 4 and frictionally contacting with the outer face of the disk 5 there is the socket end of a handle 6.

In operation, the improvement is arranged in a vessel containing milk. The milk will flow into the inverted cup-like member 1, and will pass through the openings 2 therein, from thence being contacted by the disk 5, with the result that the milk is aerated and likewise cooled. Also, I have found that my improvement acts as a preservative for milk, and as a matter of fact, I have further found that milk on the point of turning will be restored to its normal sweet condition by the use of my improvement.

Having described the invention, I claim:—

A device for cooling and aerating milk, comprising an inverted cup-shaped member having its top provided with spaced circumferential apertures, said top being centrally formed with a boss provided with an outstanding threaded stem, a disk having a central opening receiving the stem therethrough and resting on the boss, said disk having its periphery flared toward the inverted cup-shaped member, and a handle having a threaded socket end screwed on the stem and contacting the disk.

In testimony whereof I affix my signature.

JESSE C. KING.